Sept. 12, 1967
H. C. RHODES
3,340,678
HEAT-SEALING DEVICE FOR BAGS IN MOTION
Filed Nov. 9, 1964
3 Sheets-Sheet 1
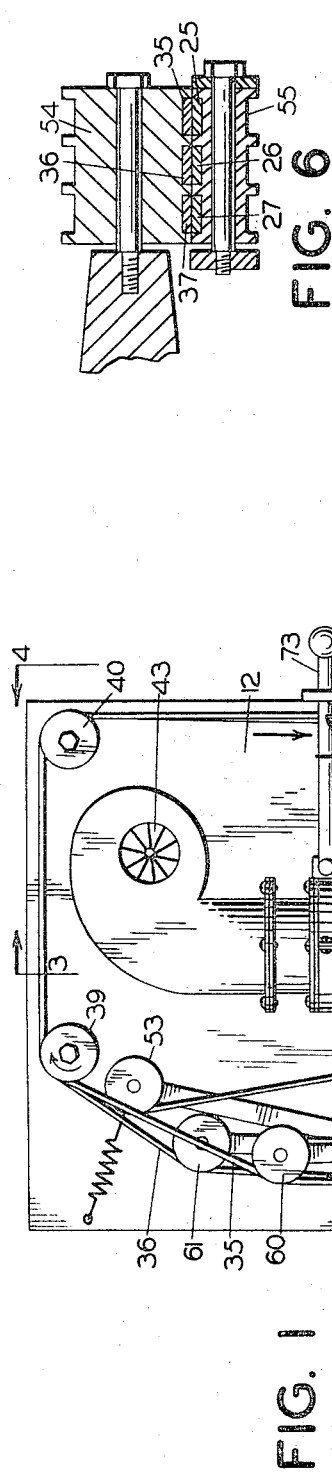
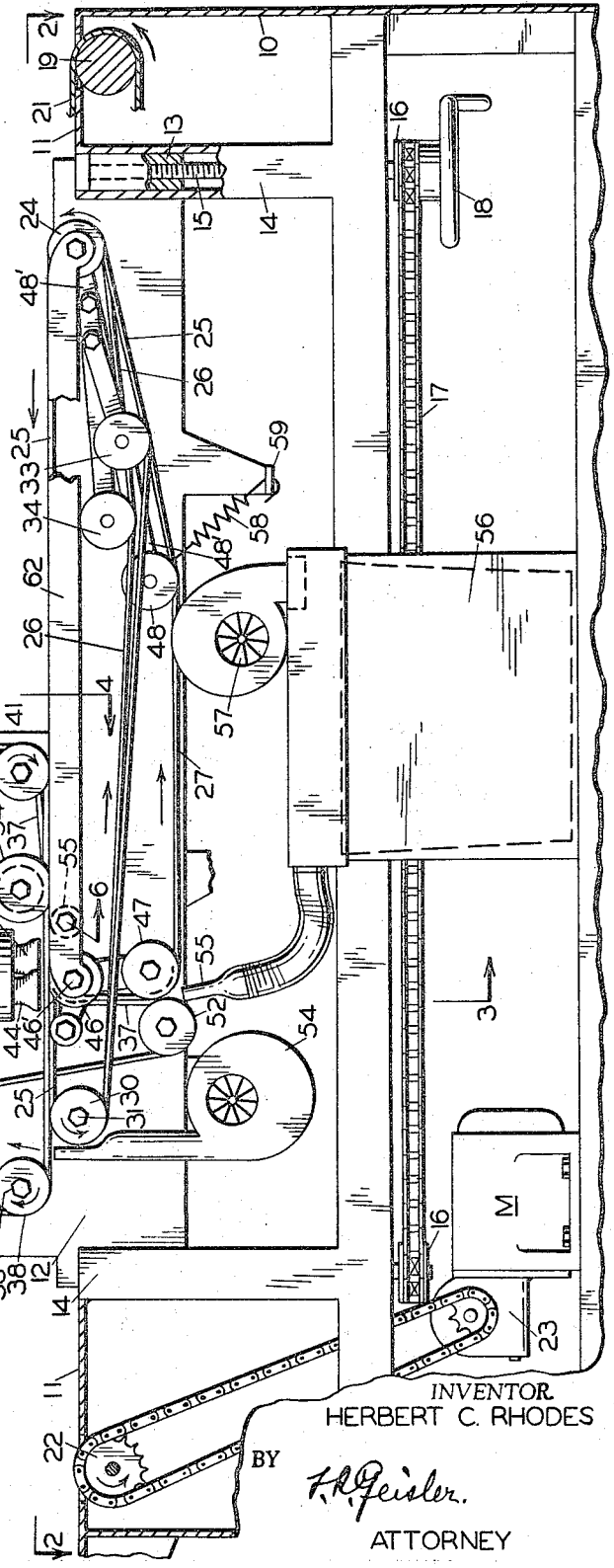
INVENTOR.
HERBERT C. RHODES
BY F. R. Geisler.
ATTORNEY Sept. 12, 1967  H. C. RHODES  3,340,678
HEAT-SEALING DEVICE FOR BAGS IN MOTION
Filed Nov. 9, 1964  3 Sheets-Sheet 2

INVENTOR.
HERBERT C. RHODES
BY
*H. R. Geisler.*
ATTORNEY

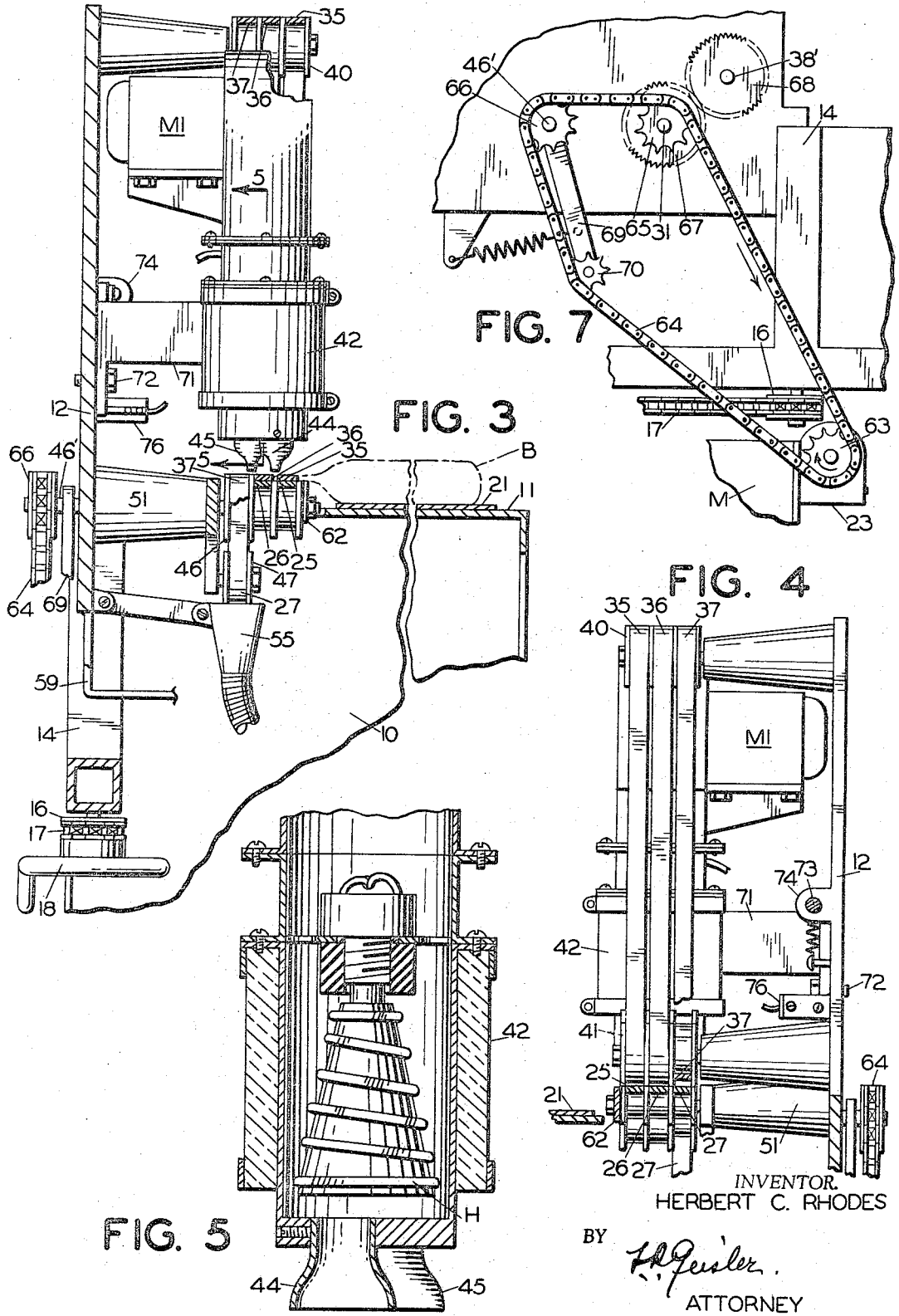

United States Patent Office 3,340,678
Patented Sept. 12, 1967

3,340,678
HEAT-SEALING DEVICE FOR BAGS IN MOTION
Herbert C. Rhodes, 10106 SE. Stark St.,
Portland, Oreg. 97216
Filed Nov. 9, 1964, Ser. No. 409,742
7 Claims. (Cl. 53—372)

ABSTRACT OF THE DISCLOSURE

Means for heat-sealing and trimming the ends of plastic bags through the medium of which a pair of parallel seal lines are produced across each bag end and the portion of the bag end beyond the outer seal line is severed and disposed of.

---

This invention relates in general to the heat-sealing of bags of thermoplastic film, particularly polyethylene film, when used for containing or packaging various articles and commodities.

More specifically, the invention relates to the heat-sealing of bags polyethylene film containing frozen bread dough loaves, or similar bulky articles, where a strong airtight seal is required for each filled bag.

One of the objects of the invention is to provide a novel heat-sealing device in which the filled bags can be heat-sealed in a special manner while being moved along on an endless conveyor or conveyor belt without requiring each bag to be halted during the actual heat-sealing operation.

A related object is to provide a heat-sealing device in which no manual holding or handling of the filled bag will be required, after the bag is set in place on the device preparatory to the heat-sealing, until the sealed bag is discharged by the device.

Another object is to provide a device for heat-sealing bags in motion which will trim off the bag ends beyond the seals during the sealing operation.

Since the trimmed ends from such sealed polyethylene bags would ordinarily have a tendency to attach themselves to the bags or to the means for conveying the trimmed ends, a related object is to provide means in a heat-sealing and trimming device for such bags in which the trimmed ends will be immediately drawn off into a collecting receptacle and thus be prevented from accumulating where not desired.

In the heat-sealing or heat-sealing and trimming of bags of thermoplastic film, where an effective airtight seal is desired and where a strain may be exerted by the bag contents on the heat-sealed end, slight defects or weak points in the sealing may result in the sealed end being pulled open at such weak points when the sealed end is subjected to a strain thus allowing openings to develop so as to render the sealing unsatisfactory and no longer airtight. A special object of the present invention accordingly is to provide a device for heat-sealing bags of thermoplastic film which will perform the heat-sealing along a pair of parallel lines spaced a slight distance apart, instead of along a single line only, thus simultaneously in effect producing a double seal so that a failure in one of the sealing lines, for example failure in either the inner or outer sealing line, will not prevent the desired complete airtight seal from being maintained.

A further object is to provide a device for heat-sealing bags in motion which will not only take care of filled bags of various sizes but also can be adjusted for filled bags having contents of various thicknesses, depending upon the nature and amount of the bag contents.

A still further object is to provide a heat-sealing device which will rapidly seal in succession of bags in motion without having any of the moving holding and guiding elements for the bags become overheated, even though the device is used continuously over a long period.

The manner in which and the means by which these objects and additional advantages are attained with the device of the present invention will be briefly explained and described with reference to the accompanying drawings, wherein:

FIG. 1 is a sectional elevation of the device taken on the line indicated at 1—1 in FIG. 2 but drawn to a slightly smaller scale;

FIG. 3 is a fragmentary vertical section on the line 3—3 of FIG. 1 drawn to the same scale as FIG. 2;

FIG. 4 is a fragmentary sectional elevation on line 4—4 of FIG. 1;

FIG. 5 is a fragmentary section on line 5—5 of FIG. 3 drawn to a larger scale,

FIG. 6 is a fragmentary section on line 6—6 of FIG. 1 drawn to a larger scale;

FIG 7 is a fragmentary rear elevation taken on the line 7—7 of FIG. 2; and

Figure 2:
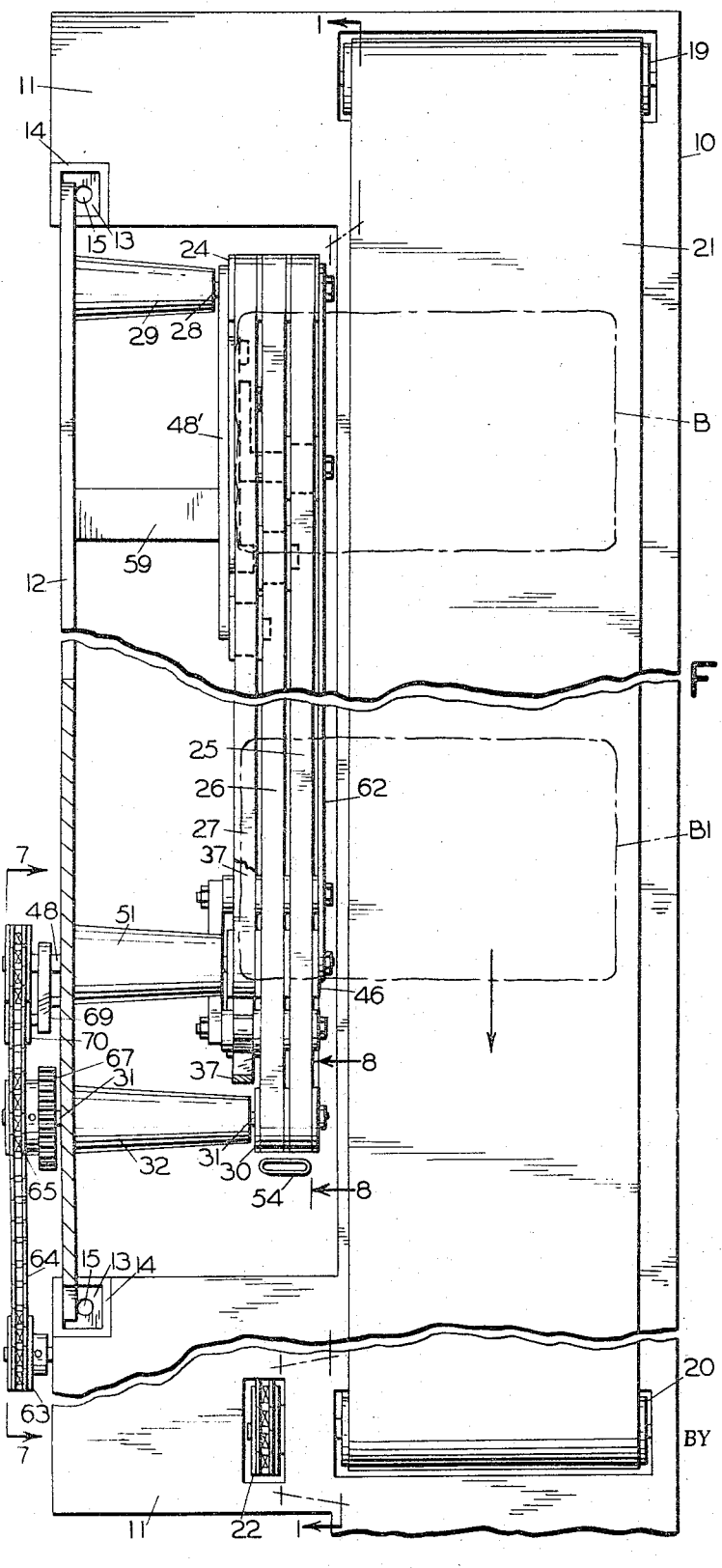
FIG. 2 is a plan section taken on the line indicated at 2—2 of FIG. 1.

Referring first to FIGS. 1 and 2, the device includes a main lower housing 10 having front and side walls and a deck 11 extending over only a portion of the lower housing. A rear wall 12, shaped as shown in FIG. 1, is adjustably mounted on the lower housing, and a portion of this rear wall extends up for considerable distance from the lower housing. The rear wall 12 is secured at each end to a pair of supporting blocks 13 which are slidably mounted in slotted vertical guideways 14 forming part of the frame work for the rear of the lower housing 10. Each of the supporting blocks 13 has threaded engagement with a vertical adjusting screw 15 and these screws are supported in suitable bearings in the base of the guideways 14. A pair of identical sprockets 16 (FIG. 1), secured on the bottom ends of the screws 15 respectively, are connected by an endless sprocket chain 17 for movement in unison, and an adjusting hand wheel 18 is connected to one of the sprockets 16 so that manipulation of the hand wheel 18 enables the rear wall to be adjusted to a limited extent up and down with respect to the lower housing 10 and, in particular, with respect to the deck 11 of the lower housing.

The deck 11 of the lower housing (FIG. 2) is provided with an opening at one end for an idler roller 19, and an opening at the other end for a driven roller 20 which rollers are end rollers for an endless conveyor 21, the top throw of which moves along over the top of the deck 11 from right to left as viewed in FIG. 2. The shaft of the driven belt roller 20 carries a sprocket 22 which is connected by a sprocket chain within the drive sprocket of a gear assembly 23 operated by a motor M (FIG. 1).

A roller 24 (FIG. 2), provided with annular grooves for three lower endless belts 25, 26, and 27, is rotatably mounted on a shaft 28 secured in a mounting block 29 which is mounted on the rear wall 12 and extends forwardly therefrom. A driven roller 30, secured on a driven shaft 31, rotatably supported in a mounting block 32 which is secured on the rear wall 12, is provided with annular grooves for the belts 25 and 26. After passing down around the driven roller 30 the belts 25 and 26 return to the roller 24, passing beneath slack-absorbing pulleys 33 and 34 (FIG. 1) respectively. The belts 25 and 26 also in their top course pass over the driven roller 46, but the belt 27 passes down around the roller 46. The roller 46 is secured on a driven shaft 46′ rotatably mounted in a mounting block 51 (FIGS. 2 and 3) secured on the rear wall 12.

A pair of cooperating upper endless belts 35 and 36 (FIGS. 1, 3, and 4,) positioned in the same vertical planes as the belts 25 and 26 respectively, have their lower courses overlying portion of the top courses of the belts 25 and 26. These upper belts pass around a driven roller 38 (FIG. 1) and around rollers 39, 40, and 41, the shafts for which are similarly mounted in mounting blocks secured on an upwardly extending portion of the rear wall 12.

A jacketed hot air chamber or chest 42 (FIGS. 1, 3, and 5), secured to a swivel bracket 71 mounted on the rear wall 12 by the pivot bolt 72 and located in the relative position indicated in FIGS. 1 and 3, contains an electric heating element H. A blower 43, driven by a motor M1, secured on the hot air chest, delivers air under pressure into the chest 42 and the air in this chest is heated to a high temperature through contact with the heating element H. The bottom of the chest 42 is provided with two identical air jet nozzles 44 and 45, so arranged as to deliver knife-like air jets onto any material passing beneath them, the longitudinal lines of these jets extend in the direction of travel of the various belts.

The third lower belt 27 (FIGS. 1 and 3), after passing down around the roller 46 passes around a guide pulley 47 and thence beneath the slack-absorbing pulley 48 on its return to the roller 24. The pulley 48 is carried on the arm 48′ pivotally mounted on the shaft for the roller 24.

Figure 8:
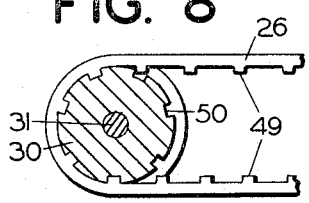
FIG. 8 is an enlarged fragmentary sectional elevation on line 8—8 of FIG. 2.

All the belts are driven in the same direction (as indicated by the arrows in FIG. 1) at the same uniform speed, the speed being the same as that at which the endless conveyor 21 is driven. The belts and their rollers are "timing" belts and rollers, that is to say, the inside face of each belt is formed with a series of equally spaced projections or ribs 49 (see FIG. 8) the annular grooves for the belts on the rollers are provided with equally spaced recesses 50 for receiving the projections 49. Thus any slipping of the belts on the rollers or any variation of the speed of one belt in respect to that of another is prevented.

A third cooperating upper belt 37, located in the same vertical plane as the lower belt 27, overlies a portion of the lower belt 27 (FIGS. 1, 3 and 6) and passes down over the roller 46 in contact with the belt 27. However the upper belt 37 leaves the lower belt 27 as the latter passes around the guide pulley 47, and the belt 37 turns in the opposite direction, passing around guide pulley 52 and then passing upwardly over a tensioning pulley 53, joining the course of the other two upper belts 35 and 36 as they move in unison around the rollers 39, 40 and 41.

From FIG. 3 it will be noted that the air jet nozzle 44 is directed down into the spacing between the pair of lower and upper belts 25, 35, and the pair of lower and upper belts 26 and 36. Similarly the air jet nozzle 45 is directed down into the spacing between the pair of lower and upper belts 26, 36, and the pair of lower and upper belts 27, 37. The manner in which the device, as thus far described, operates can now be briefly explained.

A bag B, of polyethylene film or other suitable thermoplastic film material, with its contents placed therein and the bag being ready for sealing, is placed on the endless conveyor 21 in the position indicated by the broken line in FIG. 2, with the open end portion of the bag which is to be sealed extending on over the top of the three lower belts 25, 26 and 27. When placed in this position and left free to move, the bag will be moved along in the direction indicated by the arrow in FIG. 2 and, since the three belts 25, 26 and 27 are moving at the same speed as the conveyor 21, the open end portion of the bag will move along with the belts 25, 26, and 27 until coming into contact with the three cooperating upper belts 35, 36, and 37. The engaged bag end is then momentarily held firmly between the three upper belts and the three lower belts. Upper and lower belt-engaging elements 54 and 55 (FIG. 1) aid in keeping the opposed belts pressed against the engaged bag end portion.

As the bag moves into the position indicated at B′ in FIG. 2 the jet of very hot air from the nozzle 45 (FIG. 1) first strikes the bag end between the upper belts 37 and 36 and forms a heat seal along the line of the jet, and a second hot air jet from the nozzle 44 similarly strikes the bag end between the upper belts 36 and 35 and forms another seal along the line of this second jet.

However, while the second heat seal is being performed, the end of the bag beyond the top or first seal line is pulled downwardly between the upper and lower belts 37 and 27 as these turn downwardly from the roller 46 (FIG. 1). This causes the end beyond the first seal line to become severed from the bag along this first seal line. As is well known, it is possible simultaneously to heat seal and sever two plies of thermoplastic film with the application of heat sealing means, and the severance of the bag end beyond this first seal line occurs easily and quickly under the impact of the heated air blast. The severed end is then carried downwardly between the belts 37 and 27 until these belts separate and go their different directions passing around the guide pulleys 52 and 47 respectively.

In the meantime, following the completion of the second seal line by the blast from the nozzle 44, the double sealed end of the bag moves along between the two pairs of upper and lower belts 36, 26 and 35, 25, until these separate as the lower belts pass down around the roller 30. At this point a blast of cool air discharged from the throat of an air blower 54, strikes the double sealed end of the bag and cools the same while also cooling the belts, and the sealed bag continues to be carried along on the conveyor 21 until it is discharged from the end of the same. As will be readily understood, this entire operation takes place in a very short period of time, and no handling of the filled bag occurs from the time it is first set in place on the device, with the unsealed end portion extending over the belts 25, 26 and 27 as previously mentioned, until the seal bag is discharged from the end of the conveyor 21.

Since the severed end strips of thermoplastic film would have a tendency to stick to one of the belts 27 or 37 and be carried around by the same, resulting in undesirable accumulation and possible clogging of the device, a suction spout 55 (FIG. 1) is positioned at the point where the upper and lower belts 37 and 27 separate. A suction tube connects the spout 55 with a closed container 56 in which is placed a receptacle for the severed ends collected from the bags. An air exhaust fan assembly 57 maintains a partial vacuum in the container 56 to provide the air suction in through the spout 55. This air exhaust fan assembly 57 and also the cooling air blower 54 are driven by suitable motors (not shown) connected with general control switch means (not shown).

The arm 48′ carrying the slack-absorbing pulley 48 is connected to one end of a coil spring 58 (FIG. 1), the other end of which is secured to a bracket 59. The arms carrying the slack-absorbing pulleys 33 and 34 for the belts 25 and 26 are secured by clamping bolts to the spring-controlled arm 48′. Similarly the tensioning pulley 53 for the upper belt 37 is mounted on a spring-controlled arm 53′, and tensioning pulleys 60 and 61 (FIG. 1) for the upper belts 35 and 36 respectively are mounted on arms secured by clamping bolts to the arm 53′.

A guide rail 62 is carried on the ends of the shafts which support the rollers 24 and 46, and the top of this guide rail extends in the same horizontal plane as the upper faces of the top courses of the lower belts 25, 26 and 27. Consequently the end portion of each filled bag, when the bag is set in place on the device, will extend over this guide rail onto the belts 25, 26 and 27. The height of the top of this guide rail above the conveyor belt 21 should be equal approximately to half the thickness of the filled bags which are being sealed (as indicated in FIG. 3). This height can be adjusted inasmuch as this guide rail, together with the various bag end-engaging belts and the hot air chest or chamber 42 can be moved up and down with respect to the conveyor 21 by raising or lowering the rear wall 12, which is accomplished by manual operation of the hand wheel 18 (FIG. 1) as previously explained. It has been found that the most satisfactory sealing of filled bags is performed when the end to be sealed is positioned approximately in the plane passing through the longitudinal center line of the filled bag, and such adjustment of the guide rail and belts with respect to the conveyor 21 enables this to be accomplished very easily as mentioned. This is one of the features of the invention.

The gear reduction assembly 23 (FIG. 1), driven by the motor M, which drives the sprocket 22 and the driven roller 20 for the endless conveyor 21 (FIG. 2), as previously explained, also drives the rear sprocket 63 (FIG. 7) which, through intermediary of sprocket chain 64, drives rear sprockets 65 and 66. Sprocket 65 is secured to the shaft 31 for the roller 30 (see also FIGS. 1 and 2), and sprocket 66 is secured to the shaft 46′ for the roller 46. A gear 67, also secured to shaft 31, meshes with the gear 68 secured on the shaft 38′ for the roller 38. Thus the three lower belts 25, 26 and 27 and the three upper belts 35, 36 and 37 and the conveyor 21, are all driven in unison by the motor M through the intermediary of the gear assembly 23 and the sprocket connections, sprocket chain connection and gear connections as indicated. A spring-controlled arm 69 (FIG. 7) carries a tensioning wheel 70 for the sprocket chain 64.

As previously mentioned, the hot air chest 42, with its blower and motor, is carried on a swivel bracket 71 (FIGS. 3 and 4) which bracket in turn is supported on the rear wall 12 by the pivot bolt 72. A positioning rod 73 (FIG. 1), pivotally attached to the bracket 71, slides through an opening in a holding bracket 74 which is secured on the rear wall 12. Thus manual sliding of the positioning rod 73 in the holding bracket 74 will result in tilting the air chest assembly on the pivot bolt 72. The positioning rod is provided with a pair of notches 75 each of which is adapted to engage the holding bracket 74 and hold the rod, and therewith the air chest assembly, against movement.

A master control switch 76 (FIGS. 1, 3, and 4) is mounted on the rear wall 12 in the position shown in these figures and is so arranged that, when the hot air chest assembly is swung to the position shown in FIG. 1, the swivel bracket 71 will engage the switch to cause the entire device to operate. However, the tilting of the hot air chest assembly, in clockwise direction (as viewed in FIG. 1), by manual movement of the positioning rod 73 (to the right as viewed in FIG. 1) until the other notch 75 engages the holding bracket 74 will cause the master switch to be disengaged and the operation of the device to cease. Furthermore this tilting of the air chest assembly from the operating position shown in FIG. 1, will, as apparent from this figure, cause the nozzles 44 and 45 to be swung up into oblique position sufficiently to prevent any heat damage to the various belts in the vicinity of the nozzles when the machine is shut down.

I claim:

1. In a device for heat-sealing bags of thermoplastic material, a moving endless conveyor for supporting the main body portion of each bag, two pairs of lower and upper belts moving in unison with said conveyor, the belts of each pair located in the same plane, said pairs of belts engaging the unsealed end portion of each bag between their opposed faces, said pairs of belts spaced a slight distance apart, a jet-discharging nozzle, means for delivering hot gas under pressure to said nozzle, said nozzle so arranged as to deliver a narrow, elongated jet down through the spacing in between said pairs of belts and onto the end portion of each bag as the end portion is moved along beneath said nozzle and thereby produce a sealing line across such end portion, the pair of belts spaced the furtherest from said conveyor so mounted and guided as to turn downwardly together for a short distance away from the other pair of belts upon passing said nozzle, whereby the tip end portion of each bag held between said downwardly turning pair of belts will be severed from the remaining portion of the bag end simultaneously with the forming of the heat seal line by the nozzle jet, said downwardly turning pair of belts so mounted and guided as to separate and move in opposite directions after turning downwardly for a short distance, and means for collecting the severed tips of the bags from said last mentioned pair of belts.

2. In a device for heat-sealing bags of thermoplastic film material, a moving endless conveyor for supporting the main body portion of each bag, three pairs of lower and upper belts moving in unison with said conveyor in paths parallel thereto, the belts of each pair located in the same vertical plane, said pairs of belts engaging the unsealed end portion of each bag between their opposed faces, the said opposed faces of all of said belts extending in the same horizontal plane, said pairs of belts spaced a slight distance apart, a hot air chest, means for delivering air under pressure into said chest, heating means for said chest, and a pair of identical jet discharging nozzles for said chest, said nozzles so arranged as to deliver a pair of parallel narrow elongated jets of superheated air through the spacing in between said pairs of belts and onto the end portion of each bag as the end portion is moved along past said nozzles by said pair of belts and thereby produce a pair of sealing lines across such moving end portion.

3. In a device for heat-sealing bags of thermoplastic film material, a moving endless conveyor for supporting the main body portion of each bag, three pairs of lower and upper belts moving in unison with said conveyor in paths parallel thereto, the belts of each pair located in the same vertical plane, said pairs of belts engaging the unsealed end portion of each bag between their opposed faces, the said opposed faces of all of said belts extending in the same horizontal plane, said pairs of belts spaced a slight distance apart, a hot air chest, means for delivering air under pressure into said chest, heating means for said chest, a pair of air jet discharging nozzles on the bottom of said chest, said nozzles so arranged as to deliver a pair of parallel narrow elongated jets of superheated air down through the spacing in between said pairs of belts and onto the end portion of each bag as the end portion is moved along beneath said nozzles by said pair of belts and thereby produce a pair of sealing lines across such end portion, the pair of belts spaced the furthest from said conveyor so mounted and guided as to turn downwardly together away from the other two pairs of belts upon passing the nozzle closest to said downwardly turning pairs of belts, whereby the tip of the end portion of each bag held between the downwardly turning pair of belts will be severed from the remaining portion of the bag end simultaneously with the forming of a heat seal line by the air jet from said last mentioned nozzle.

4. The combination set forth in claim 3 with the addition of means for collecting the severed tips of the end portions of the bags as the severed tips are carried downwardly by said downwardly turning pairs of belts.

5. A device for heat-sealing bags of thermoplastic film material including a moving endless conveyor for supporting the main body portion of each bag, three pairs of lower and upper belts moving in unison with said conveyor in paths parallel thereto, the belts of each pair located in the same vertical plane, said pairs of belts engaging the unsealed end portion of each bag between their opposed faces, the said opposed faces of all of said belts extending in the same horizontal plane, said pairs of belts spaced a slight equal distance apart, a hot air chest, means for delivering air under pressure into said chest, heating means for said chest, a pair of jet discharging nozzles for said chest, said nozzles so arranged as to deliver a pair of parallel narrow elongated jets of superheated air through the spacing in between said pairs of belts and onto the end portion of each bag as the end portion is moved along past said nozzles by said pairs of belts and thereby produce a pair of sealing lines across such end portion, a guide rail between said conveyor and said belts, the top of said guide rail extending in the same horizontal plane as said opposed faces of said belts, and means for adjusting the elevation of said belts, guide rail and nozzles and the elevation of said conveyor relatively with respect to each other, whereby to accommodate filled bags of different thickness.

6. A device for heat-sealing bags of thermoplastic film material including a moving endless conveyor for supporting the main body portion of each bag, three pairs of lower and upper belts moving in unison with said conveyor in paths parallel thereto, the belts of each pair located in the same vertical plane, said pairs of belts engaging the unsealed end portion of each bag between their opposed faces, the said opposed faces of all of said belts extending in the same horizontal plane, said pairs of belts spaced a slight equal distance apart, a hot air chest, means for delivering air under pressure into said chest, heating means in said chest, a pair of identical air jet discharging nozzles on the bottom of said chest, said nozzles so arranged as to deliver a pair of parallel narrow elongated jets of superheated air down through the spacing in between said pairs of belts and onto the end portion of each bag as the end portion is moved along beneath said nozzles by said pair of belts and thereby produce a pair of sealing lines across such end portion, the pair of belts spaced the furthest from said conveyor so mounted and guided as to turn downwardly together away from the other two pairs of belts upon passing the furthest nozzle from said conveyor, whereby the tip of the end portion of each bag held between the downwardly turning pairs of belts will be severed from the remaining portion of the bag end simultaneously with the forming of the heat seal line by the air jet from such furthest nozzle, said last mentioned nozzle positioned slightly ahead of the other of said nozzles in the direction opposite the direction of travel of said conveyor and said belts, means for collecting the severed tips of the end portions of the bags as the severed tips are carried downwardly by said downwardly turning pairs of belts, means for adjusting the elevation of said belts, guide rail and nozzles and the elevation of said conveyor relatively with respect to each other, whereby to accommodate filled bags of different thickness, and means for delivering cooling air onto the belts and sealed end of each bag beyond said nozzles.

7. The combination set forth in claim 6 with the addition of a movable support mounting for said hot air chest and nozzles, and manually operable means for moving said chest and nozzles into and out of normal operating position, said mounting so arranged that the moving of said chest and nozzles out of normal operating position will reduce the amount of heat received by said belts from said nozzles.

References Cited
UNITED STATES PATENTS

| | | | |
|---|---|---|---|
| 2,474,035 | 6/1949 | Crandon | 156—497 X |
| 2,997,098 | 8/1961 | Riese et al. | 156—497 |
| 3,015,920 | 1/1962 | Saumsiegle | 53—372 X |
| 3,278,358 | 10/1966 | Rosewicz et al. | 156—497 X |

TRAVIS S. McGEHEE, *Primary Examiner.*